United States Patent
Rosenstock et al.

(10) Patent No.: US 9,524,032 B2
(45) Date of Patent: Dec. 20, 2016

(54) METHOD AND DEVICE FOR OPERATING A MOTOR VEHICLE COMPONENT BY MEANS OF GESTURES

(71) Applicant: CONTINENTAL AUTOMOTIVE GMBH, Hannover (DE)

(72) Inventors: Thomas Rosenstock, Munich (DE); Alexander Stege, Rohrbach (DE)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 14/427,602

(22) PCT Filed: Sep. 9, 2013

(86) PCT No.: PCT/EP2013/068550
§ 371 (c)(1),
(2) Date: Mar. 11, 2015

(87) PCT Pub. No.: WO2014/040930
PCT Pub. Date: Mar. 20, 2014

(65) Prior Publication Data
US 2015/0234470 A1 Aug. 20, 2015

(30) Foreign Application Priority Data
Sep. 12, 2012 (DE) .......................... 10 2012 216 193

(51) Int. Cl.
*G06F 3/01* (2006.01)
*B60K 37/00* (2006.01)

(52) U.S. Cl.
CPC ............... *G06F 3/017* (2013.01); *B60K 37/00* (2013.01); *B60K 2350/1052* (2013.01); *B60K 2350/2013* (2013.01)

(58) Field of Classification Search
CPC .................................. G06F 3/017; B60K 37/00
See application file for complete search history.

(56) References Cited

U.S. PATENT DOCUMENTS 6,002,808 A * 12/1999 Freeman ................. G06F 3/017
                                                        348/171
7,289,645 B2    10/2007 Yamamoto et al.
(Continued)

FOREIGN PATENT DOCUMENTS

DE       100 22 321 A1    11/2001
DE       103 49 568 A1     5/2004
(Continued)

OTHER PUBLICATIONS

Willian Strunk Jr., and E.B. White, The Elements of Style, 3rd Ed, 1979, all pages.*

*Primary Examiner* — Calvin Cheung
(74) *Attorney, Agent, or Firm* — Cozen O'Connor

(57) ABSTRACT

A method for operator control of a motor vehicle component by a gesture includes: detecting the gesture being executed by an input unit of an operator in a three-dimensional operator control space, which is part of an interior of a motor vehicle; executing an operator control function associated with the identified gesture; and outputting a feedback signal as soon as the input unit enters or has entered the three-dimensional operator control space from outside the three-dimensional operator control space.

14 Claims, 1 Drawing Sheet

(56) References Cited

U.S. PATENT DOCUMENTS

| | | | |
|---|---|---|---|
| 2002/0126876 A1* | 9/2002 | Paul | G06F 3/017 382/104 |
| 2003/0167119 A1* | 9/2003 | Cherveny | G06F 3/017 701/409 |
| 2004/0141634 A1* | 7/2004 | Yamamoto | B60K 37/06 382/104 |
| 2006/0136846 A1* | 6/2006 | Im | G06F 3/017 715/863 |
| 2007/0244613 A1* | 10/2007 | Ishikawa | B60K 37/06 701/29.2 |
| 2008/0085048 A1* | 4/2008 | Venetsky | G06K 9/00355 382/153 |
| 2009/0222149 A1* | 9/2009 | Murray | A63H 30/04 701/2 |
| 2010/0052931 A1* | 3/2010 | Kolpasky | B60R 25/00 340/670 |
| 2010/0066676 A1* | 3/2010 | Kramer | G06F 3/017 345/158 |
| 2010/0185341 A1* | 7/2010 | Wilson | B60R 25/2045 701/1 |
| 2011/0050589 A1* | 3/2011 | Yan | B60K 37/06 345/173 |
| 2011/0218696 A1* | 9/2011 | Okada | G01C 21/36 701/1 |
| 2011/0221669 A1* | 9/2011 | Shams | G02B 27/017 345/156 |
| 2011/0286676 A1* | 11/2011 | El Dokor | G06F 3/017 382/225 |
| 2012/0068956 A1* | 3/2012 | Jira | B60K 37/06 345/174 |
| 2012/0105613 A1* | 5/2012 | Weng | G01C 21/3664 348/77 |
| 2012/0283896 A1* | 11/2012 | Persaud | A63F 13/06 701/2 |
| 2013/0024071 A1* | 1/2013 | Sivertsen | B60K 35/00 701/41 |
| 2013/0066526 A1* | 3/2013 | Mondragon | G09G 5/00 701/48 |
| 2013/0076615 A1* | 3/2013 | Iao | G06F 3/017 345/156 |
| 2013/0204457 A1* | 8/2013 | King | B60K 28/06 701/1 |
| 2014/0181759 A1* | 6/2014 | Kim | B60K 35/00 715/863 |

FOREIGN PATENT DOCUMENTS

| | | |
|---|---|---|
| EP | 2 372 512 A1 | 10/2011 |
| GB | 2 355 055 A | 4/2001 |
| WO | WO 2009/155464 A1 | 12/2009 |
| WO | WO 2009/155465 A1 | 12/2009 |
| WO | WO 2012/028 884 A1 | 3/2012 |

\* cited by examiner

METHOD AND DEVICE FOR OPERATING A MOTOR VEHICLE COMPONENT BY MEANS OF GESTURES

CROSS-REFERENCE TO RELATED APPLICATIONS

This is a U.S. national stage of application No. PCT/EP2013/068550, filed on 9 Sep. 2013, which claims priority to the German Application No. DE 10 2012 216 193.7 filed 12 Sep. 2012, the content of both incorporated herein by reference.

BACKGROUND OF THE INVENTION

1. Field of the Invention

The invention relates to a method for operator control of a motor vehicle component by gestures, which involves a gesture executed by an input unit, particularly a hand or portions of a hand of an operator, in a three-dimensional operator control space that is part of an interior of a motor vehicle being detected and an operator control function linked to the identified gesture being executed. In addition, the invention relates to an operator control unit of a motor vehicle for operator control of a motor vehicle component by gestures.

2. Related Art

Motor vehicle components can be operated in different ways. A notion in widespread use is operator control by mechanical or electromechanical operator control elements such as switches, rotary controls or rotary/push controls. Operator control of motor vehicle components by voice is also already in use. In addition, motor vehicles also involve the use of touch screens and touch pads, which can be used to operate motor vehicle components conveniently. In the case of these, operator control can then also be effected by handwritten input of letters or characters, for example.

Furthermore, operator control of motor vehicle components by gestures is fundamentally known. One such method is described in WO 2009/155464 A1, for example. The gestures, which may be finger or hand gestures, for example, are detected and converted into an operator control function. The gestures can be executed in multiple stages, for example in order to select a particular entry within a list and then to activate a particular function in respect of this list entry. For basic functions, such as the adjustment of a volume, single gestures are provided, so that the choice of operator control steps is minimal in this case. The system described therein also has provision for audible feedback that relates to the gesture itself. By way of example, feedback by synthesized voice is thus provided for an identified gesture.

Normally, the gesture needs to be executed in a predefined three-dimensional operator control space. This operator control space is part of the motor vehicle interior, but the boundaries of the operator control space cannot be identified by an operator, particularly the driver of the motor vehicle. Therefore, the operator remains uncertain as to whether he is actually in the provided three-dimensional operator control space when executing the gesture.

SUMMARY OF THE INVENTION

An object of the invention is to assist the operator in identifying the three-dimensional operator control space.

The inventive method for operator control of a motor vehicle component by gestures involves a gesture executed by an input unit, particularly a hand or portions of a hand of an operator, in a three-dimensional operator control space that is part of an interior of a motor vehicle being detected and an operator control function linked to the identified gesture being executed, wherein a feedback signal is output as soon as the input unit enters or has entered the three-dimensional operator control space from the outside.

The feedback signal can be output audibly or visually, in particular. In addition, a haptic feedback signal is also possible.

The production of the feedback signal is possible in different variants. By way of example, the feedback signal can be produced when the input unit has entered the three-dimensional operator control space completely, so that a gesture can be executed immediately. Alternatively, the feedback signal can be produced as soon as a first subregion, for example a fingertip, of a hand enters the three-dimensional operator control space. In this case, the operator is provided with the feedback even before the input unit is in the three-dimensional operator control space completely. On the basis of the direction of movement of the input unit, however, it is already evident to the operator in which direction he needs to continue to move the input unit so that it enters the three-dimensional operator control space completely. In the case of this second variant, the feedback signal when the input unit enters the operator control space only partially may be different than in the case in which the input unit enters the operator control space completely. By way of example, when a fingertip enters the operator control space, it is possible for an audible signal to be output whose frequency increases or decreases until the input unit has entered the operator control space completely.

In order to detect the gesture, it is possible for a movement and/or a state of the input unit to be detected and for corresponding parameters to be extracted. The extracted parameters can be compared with stored gesture parameters, and a sufficient match between the extracted parameters and stored gesture parameters for a gesture can prompt an operator control function linked to the gesture to be selected.

If there is provision for a visual feedback signal, this may involve the particular provision of a visual display in the primary field of vision of the driver of the motor vehicle, which visual display lights up when the input unit enters the operator control space, for example, or the color of which visual display changes when the input unit enters the operator control space. By way of example, a change of color may be embodied such that entry of a subregion of the input unit into the operator control space prompts the emission of yellow-orange light that changes through yellow to green as the input unit increasingly enters the operator control space, green light meaning that the input unit has entered the operator control space completely and a gesture can be executed.

The feedback signal can be output while the input unit is in the three-dimensional operator control space and as yet no gesture has been detected. This provides the operator with the feedback that it is possible for a gesture to be executed. If the output of the feedback signal is ended following identification of a gesture, then the operator is also provided with the feedback about identification of the gesture. Alternatively, identification of a gesture can also prompt an altered feedback signal to be output in order to provide the operator with appropriate advice. In particular, the operator control function linked to the identified gesture can be output in spoken form.

If the feedback signal is output as a continuous audible feedback signal, the operator is provided with the same feedback while the input unit is in the three-dimensional operator control space.

If the feedback signal is output as a variable audible feedback signal, the change in the audible feedback signal can be used to signal to the operator that he is approaching a marginal region of the three-dimensional operator control space. In this case, the operator is provided with further advice of the boundaries of the operator control space.

The audible feedback signal can be output at variable frequency on the basis of a speed of movement of the input unit or a position of the input unit in the three-dimensional operator control space. Alternatively, the feedback signal can also be output at variable volume in these cases.

If the input unit is a hand of the operator, the audible feedback signal can be output with a harmonic distortion on the basis of an open state of the hand. In other words, the harmonic distortion is dependent on whether the hand is open or closed.

In addition, provision may be made for the audible feedback signal to be output only if an activation step has previously been performed. This activation step can either switch the audible feedback itself on and off or activate the system.

In addition, a termination gesture may be provided, and a detected termination gesture prompts the audible feedback signal to be terminated and/or the gesture input to be ended. This allows the process to be terminated early in the event of the input unit entering the three-dimensional operator control space inadvertently.

An inventive operator control unit of a motor vehicle for operator control of a motor vehicle component by gestures can

- detect a movement by an input unit, particularly a hand or portions of a hand of an operator, in a three-dimensional operator control space that is part of an interior of the motor vehicle,
- extract state and/or movement parameters for the input unit,
- compare the extracted parameters with stored gesture parameters for gestures,
- select an operator control function for the motor vehicle component, which operator control function is linked to an identified gesture, wherein the operator control unit additionally has a feedback unit that is configured to produce a feedback signal as soon as the input unit enters or has entered the three-dimensional operator control space from the outside.

BRIEF DESCRIPTION OF THE DRAWINGS

The invention is explained in more detail below with reference to an exemplary embodiment and the figures, in which.

DETAILED DESCRIPTION OF THE PRESENTLY PREFERRED EMBODIMENTS

Figure 1:
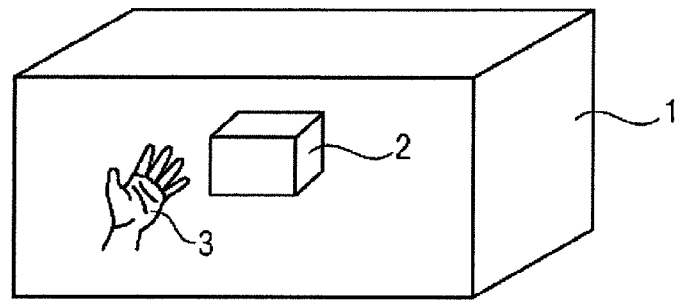
FIG. 1 shows a basic illustration of the arrangement of the operator control space.

FIG. 1 schematically shows a motor vehicle interior 1 as a cuboid. Arranged inside the motor vehicle interior 1 is a three-dimensional operator control space 2 that is monitored by a sensor, particularly a camera, and that has no visible boundaries. Inside the operator control space 2, it is possible to use a hand 3 in a known manner to execute gestures that can be used to operate a motor vehicle component. By way of example, the operator control space 2 is arranged in proximity to a central console of the motor vehicle so as to be easily reached by the driver. When the hand 3 of the operator, particularly the driver, enters the operator control space 2, a feedback signal is produced in order to provide the operator with appropriate feedback. The effect achieved by this is that the operator can reliably identify that his hand 3 is in the operator control space 2. In a first variant, the feedback signal is produced when the hand 3 is in the operator control space 2 completely, as a result of which it is possible for gestures to be executed immediately. In another embodiment, the feedback signal is output just when a fingertip of the hand 3 enters the operator control space 2. In this case, the operator is provided with early feedback indicating that a hand is now entering the operator control space 2 but has not yet entered completely. In the case of this embodiment, the feedback signal can be output in varied fashion from entry of the fingertip into the operator control space 2 through to complete entry of the hand 3 into the operator control space 2, so that the operator is provided with appropriate feedback. If the feedback signal is output audibly, for example, it is possible for the frequency of the audible feedback signal to be raised or lowered continuously from entry of the fingertip into the operator control space 2 through to entry of the complete hand 3 into the operator control space 2. When the hand 3 has entered the operator control space 2 completely, the frequency is then kept constant.

When a gesture is detected after the hand 3 has entered the operator control space 2, an altered feedback signal is output in order to signal to the operator that the gesture has been identified. An altered feedback signal may particularly also include reproduction of the selected operator control function. If the gesture activates a function for raising the volume of a car radio, for example, the audible feedback that is output can be the voice output "Raise volume" or "The volume is being raised".

If the hand 3 is in the operator control space 2 and as yet no gesture has been identified, the audible feedback signal can also be output at variable frequency or variable volume on the basis of a speed of movement of the hand 3 or a position of the hand 3 in the three-dimensional operator control space 2. This allows the operator to be provided with further information about the operator control process, for example that the hand 3 is approaching the outer boundaries of the operator control space 2 and there is therefore the risk of the hand 3 leaving the operator control space 2 and the gesture not being able to be captured completely.

The feedback signal provided may particularly also be a visual feedback signal. In this case, a colored LED display, for example, may be provided in the primary field of vision of the driver. If the hand 3 is in the operator control space 2 completely, this LED display can imitate green light in order to signal to the driver that he can begin inputting the gesture. If the hand 3 enters the operator control space 2 only partially, a different color of light can be output so as also to signal this state to the driver. Alternatively, the visual feedback can be output via a head-up display.

So that, when a gesture is executed inadvertently in the operator control space 2, it is possible to stop the execution of the corresponding operator control function, a termination gesture is provided, in particular, that can be used to cancel the operator control function previously selected by means of a gesture. This termination gesture can also be used when, although the hand 3 enters the operator control space 2 deliberately, an operator control gesture is not intended to be executed. In this case, the termination gesture can end the feedback signal.

Figure 2:
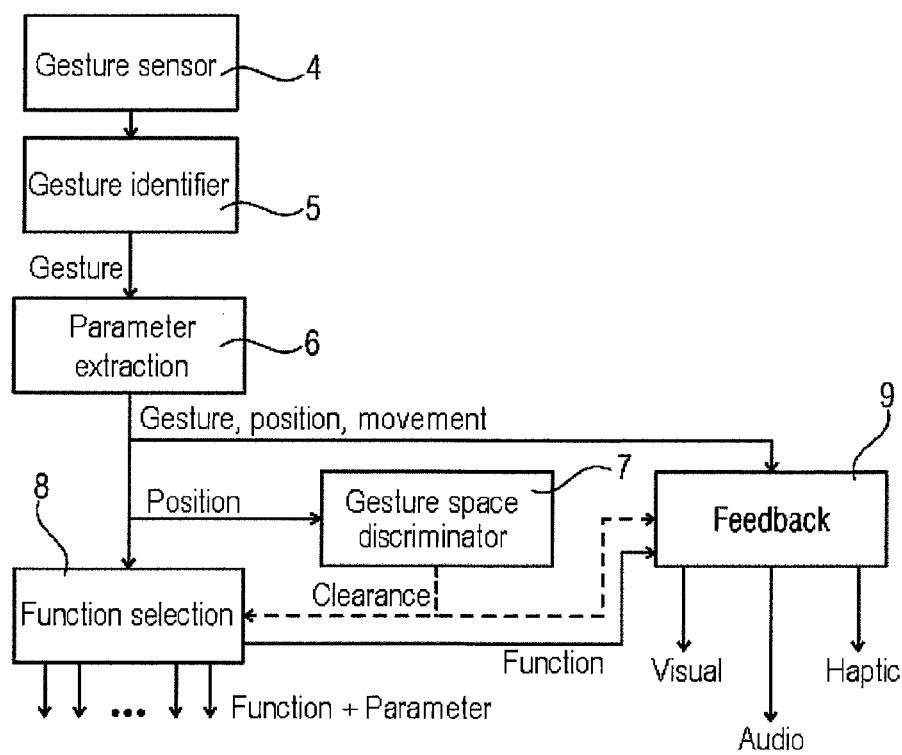
FIG. 2 shows a block diagram of an operator control unit.

FIG. 2 shows a block diagram of an operator control unit for carrying out the inventive method. A gesture sensor 4, which is arranged in the interior 1 of the motor vehicle and monitors the operator control space 2, is used to record a three-dimensional image of the operator control space 2. The gesture sensor 4 is therefore particularly a camera or a camera system. The output side of the gesture sensor 4 is connected to a gesture identifier 5. The gesture sensor 5 performs segmentation, in particular, i.e., the image component of the hand 3 is separated from the background image. The gesture identifier 5 produces a list containing information, for example about the orientation of the hand or of the individual fingers and the movement of the hand or of the fingers. These parameters are supplied to the parameter extraction module 6, which takes the information or parameters provided by the gesture identifier 5 and extracts the parameters that are required for gesture identification. A position extracted by the parameter extraction module 6 for the hand 3 is supplied to a gesture space discriminator 7. The gesture space discriminator 7 checks whether the hand 3 is inside the operator control space 2. The gesture sensor 4 monitors a space that is larger than the operator control space 2, but this space is not sharply delimited. For the purpose of reliable identification of a gesture, the delimited operator control space 2 is therefore defined.

The output side of the parameter extraction module 6 is furthermore connected to a function selection module in which a function selection is associated with extracted parameters or the gesture detected thereby. The function selection module 8 is therefore used to select and activate the corresponding operator control function.

Function selection in the function selection module 8 takes place only when the hand 3 is in the operator control space 2, that is to say that the gesture has also been executed in the operator control space 2. The relevant information in this regard is obtained by the function selection module 8 from the gesture space discriminator 7.

Furthermore, the parameter extraction module 6 is connected to an audible feedback module 9. The audible feedback module 9 is used to produce and output an audible signal as soon as the hand 3 enters the operator control space 2. The clearance for output of the feedback signal is obtained by the audible feedback module 9 from the gesture space discriminator 7. From the parameters obtained from the parameter extraction module 6, the feedback module 9 can additionally derive the type of audible feedback, e.g., a signal with increasing frequency when the hand 2 has entered the operator control space 3.

At least some of the cited modules, such as the gesture identifier 5, the parameter extraction module 6 and the gesture space discriminator 7, are entirely or partly in the form of part of a computer program that runs on a microprocessor unit.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for operator control of a motor vehicle component by a gesture, the method comprising:
   detecting the gesture being executed by an input unit of an operator in a three-dimensional operator control space (2), which is part of an interior (1) of a motor vehicle;
   executing an operator control function associated with the identified gesture; and
   outputting a feedback signal as soon as the input unit enters or has entered the three-dimensional operator control space (2) from outside the three-dimensional operator control space (2),
   wherein the feedback signal is output while the input unit is in the three-dimensional operator control space (2) and no gesture has been detected.

2. The method as claimed in claim 1, wherein the detecting step comprises:
   detecting at least one selected from the group consisting of: (a) a movement of the input unit and (b) a state of the input unit, and extracting corresponding parameters;
   comparing the extracted parameters with stored gesture parameters; and
   selecting an operator control function linked to said gesture if there is a sufficient match between the extracted parameters and the stored gesture parameters.

3. The method as claimed in claim 1, wherein the output of the feedback signal is terminated, or an altered feedback signal is output, as soon as a gesture has been detected.

4. The method as claimed in claim 1, wherein the feedback signal is output as an audible, visual or haptic feedback signal.

5. The method as claimed in claim 4, wherein the feedback signal is output as a continuous audible feedback signal.

6. The method as claimed in claim 4, wherein the feedback signal is output as a variable audible feedback signal.

7. The method as claimed in claim 6, wherein the audible feedback signal is output at a variable frequency on the basis of a speed of movement of the input unit or a position of the input unit in the three-dimensional operator control space (2).

8. The method as claimed in claim 6, wherein the audible feedback signal is output at variable volume on the basis of a speed of movement of the input means or the position of the input unit in the three-dimensional operator control space (2).

9. The method as claimed in claim 4, wherein the input unit is a hand (3) and the audible feedback signal is output with a harmonic distortion on the basis of an open state of the hand (3).

10. The method as claimed in claim 1, further comprising an activation step, wherein the feedback signal is output only if the activation step has been performed.

11. The method as claimed in claim 1, wherein the input unit comprises a hand (3) or portions of a hand of an operator.

12. A method for operator control of a motor vehicle component by a gesture, the method comprising:
- detecting the gesture being executed by an input unit of an operator in a three-dimensional operator control space (2), which is part of an interior (1) of a motor vehicle;
- executing an operator control function associated with the identified gesture; and
- outputting a feedback signal as soon as the input unit enters or has entered the three-dimensional operator control space (2) from outside the three-dimensional operator control space (2),
- wherein the detecting step comprises:
  - detecting at least one selected from the group consisting of: (a) a movement of the input unit and (b) a state of the input unit, and extracting corresponding parameters;
  - comparing the extracted parameters with stored gesture parameters; and
  - selecting an operator control function linked to said gesture if there is a sufficient match between the extracted parameters and the stored gesture parameters, and
- wherein the stored gestures contain a termination gesture, and a detected termination gesture prompts at least one selected from the group consisting of: (a) terminating the feedback signal and (b) ending the gesture input.

13. An operator control unit of a motor vehicle for operator control of a motor vehicle component by a gesture, comprising:
- a detecting unit that detects a movement by an input unit in a three-dimensional operator control space (2), which is part of an interior (1) of the motor vehicle;
- an extraction unit that extracts parameters corresponding to at least one selected from the group consisting of: (a) a state of the input unit and (b) a movement of the input unit;
- a comparison unit that compares the extracted parameters with stored gesture parameters for gestures;
- a selecting unit that selects an operator control function for the motor vehicle component, which operator control function is linked to an identified gesture; and
- a feedback unit (9) that produces a feedback signal as soon as the input unit enters or has entered the three-dimensional operator control space (2), the feedback signal being output while the input unit is in the three-dimensional operator control space (2) and no gesture has been detected.

14. The operator control unit as claimed in claim 13, wherein the input unit comprises a hand (3) or portions of a hand of an operator.

* * * * *